Figure 1:
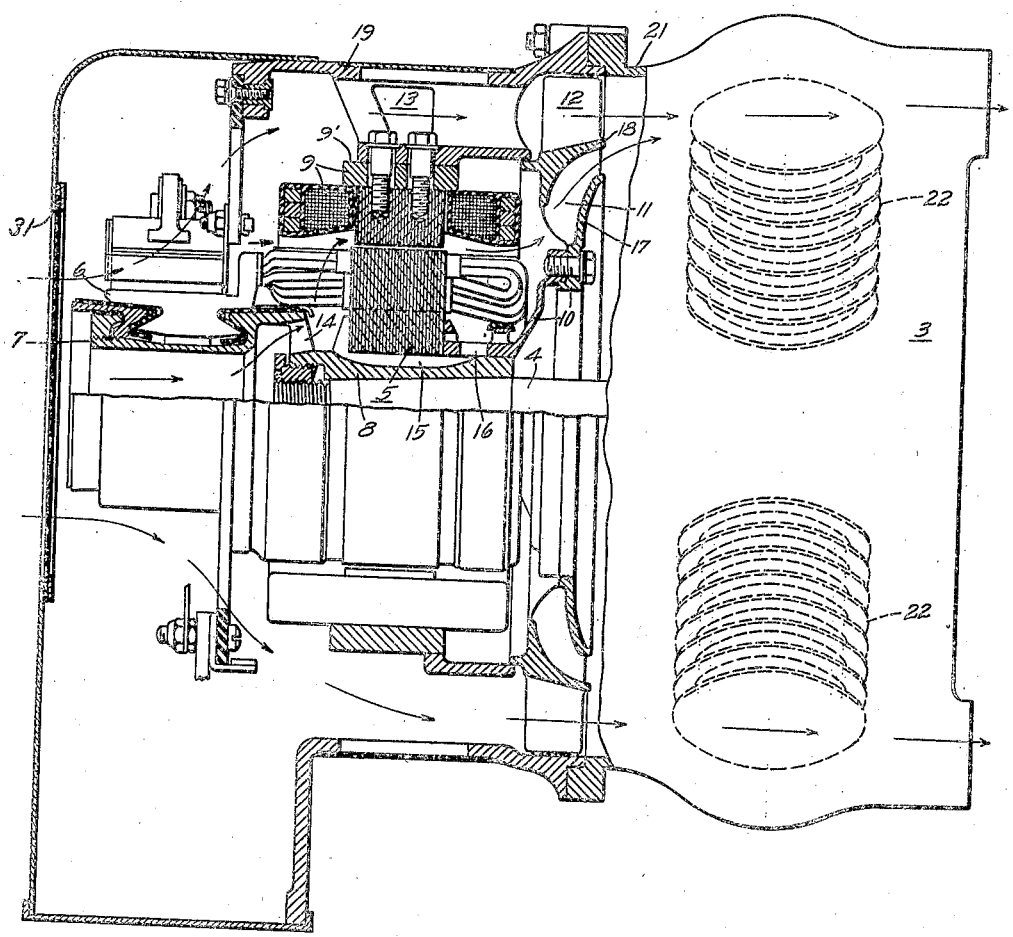

May 6, 1941.                G. A. MOORE                2,240,664
                 ELECTRIC POWER PLANT VENTILATING SYSTEM
                    Filed Nov. 15, 1939        2 Sheets-Sheet 1

WITNESSES:
                                                INVENTOR
                                             George A. Moore.
                                          BY
                                               ATTORNEY May 6, 1941. G. A. MOORE 2,240,664
ELECTRIC POWER PLANT VENTILATING SYSTEM
Filed Nov. 15, 1939 2 Sheets-Sheet 2

WITNESSES:
C. J. Weller.
Wm. C. Groome

INVENTOR
George A. Moore.
BY O. B. Buchanan
ATTORNEY

Patented May 6, 1941

2,240,664

UNITED STATES PATENT OFFICE 2,240,664

ELECTRIC POWER PLANT VENTILATING SYSTEM

George A. Moore, Edgewood, Pa., assignor to Westinghouse Electric & Manufacturing Company, East Pittsburgh, Pa., a corporation of Pennsylvania Application November 15, 1939, Serial No. 304,521

17 Claims. (Cl. 290—1)

My present invention relates to the combination including an improved fan-structure and fan-combination for ventilating or cooling an electric power plant which is particularly adapted for use in applications, such as on aircraft, where weight-requirements are at a premium. The particular type of power plant to which my invention particularly relates is a plant consisting of a gasoline engine or internal-combustion engine having an overhanging shaft-end which drives a direct-current generator for generating electric power for auxiliary purposes, or purposes other than the main drive, on the aircraft or other transportation-device on which the invention is utilized.

The principal object of my invention is to provide adequate ventilation for both the generator and the engine, with a minimum weight of the power plant itself, and with a maximum efficiency of the ventilating means, so as to require a minimum amount of power to drive the fan or fans. The power-requirement is important because aircraft must start out with a sufficient quantity of gasoline to ventilate the auxiliary power plant throughout the entire flight, so that any saving in the power-requirements necessary to drive the fan or fans results in a saving in the quantity of gasoline which must be carried by the aircraft during the difficult take-off operation when the craft is heavily loaded, not only with its carrying load, but also with its full maximum quota of gasoline.

My invention more particularly relates to that type of electric power plant in which the generator requires a relatively small quantity of cooling air, but the cooling air must flow through relatively restricted ventilating passages in the generator, so that a relatively large pressure-head is consumed by the ventilating air in passing through the generator, whereas the prime mover or internal-combustion engine requires a relatively large amount of air, at an intake temperature which may be higher than is desirable for the intake-air of the generator, but the air pressure-head consumed in the internal-combustion engine is relatively low, because of the relatively open passages which are provided for directing the air over the engine-cylinders or other heat-exchanging surfaces of the engine.

The particular type of electric generator for which my invention was particularly designed is a direct-current generator which, in common with other direct-current machines, as distinguished from alternating-current machines in general, is distinguished by the necessity for very thoroughly cooling the armature or rotor-member, rather than the stator-member of the machine, thus requiring that the ventilating air shall pass through air-passages which are necessarily quite restricted in their cross-section, because of the necessity for limiting the overall diameter of the rotor-member in order to conserve weight and cost.

In a combination of the type just described, my invention effects a material saving in the power required to ventilate both the generator and the engine, by utilizing two different fans, which may be either altogether separate and distinct from each other, or, more generally, may be two different blade-portions of the same fan, one fan or blade-portion being designed to handle only the relatively small quantity of air required by the generator, but developing the high air-pressure head necessary to overcome the pressure-drop of the ventilating-air in the generator, while the other fan handles a relatively large quantity of air, but develops only a relatively small air-pressure head, the two fans uniting to furnish the ventilating air for the engine, with the two fans operating either in parallel or in series.

This arrangement results in a decrease in the power necessary to drive the fans, because the useful energy of a fan is the product of the rate of air-flow multiplied by the pressure-head created or generated by the fan. Thus, if all of the air which was required by the engine were passed through the restricted ventilating passages of the electric machine, a great deal more energy would be required, for driving the fan, than in my present design, in which only the relatively small amount of air required by the generator is passed through the generator, under the relatively high pressure-head, while the difference in air-pressure necessary to ventilate the generator and the engine, respectively, is made up for by the provision of the second fan which is capable of handling a large quantity of air, but which develops only a relatively low air-pressure, so that the engine gets the air discharged from the generator, plus additional ventilating-air, as well.

A more specific object of my invention is to considerably improve the ventilation of a direct-current dynamo-electric machine, particularly a direct-current generator of the type which is utilized in a power plant in combination with a direct-connected internal-combustion engine. More particularly still, my invention relates to small, low-voltage direct-current generators of a type in which about one-third of the entire generator-losses occur at the commutator, due to resistance-drops and friction. Ordinarily, air is drawn in, at the commutator end of the machine, and after ventilating the commutator, it next passes between the stator poles and through the air gap of the machine so as to ventilate the rest of the machine, the air finally being expelled at the rear, or opposite, end of the machine. In a machine which is designed so as to have the utmost minimum, in size and weight, the spaces between the stator poles, as well as the air-gap spaces, are definitely limited, so that only a relatively small quantity of air can pass over the hot commutator and thence on through these spaces so as to ventilate the rest of the machine. Consequently, in such machines the ventilating air passes relatively slowly over the hot commutator and becomes excessively heated before it enters the spaces between the stator poles and the air gap, resulting in overheating of the machine-proper.

In accordance with my present invention, I provide the generator with a housing having an air-inlet opening adjacent to the commutator member, and I provide ventilating- means for causing ventilating-air to pass through the generator-proper and for causing more air to be drawn into the housing than can be drawn the rest of the way through the generator-proper, said air passing axially through said air-inlet opening and including a strong blast blowing strongly over said commutator member. In addition, in accordance with my invention, the housing is provided with a tubular portion which surrounds the generator-proper in spaced relation thereto, and the ventilating-means is so designed as to cause most of the commutator-ventilating air to be drawn through the surrounding-space between the generator-proper and the housing. The result of this arrangement is that the commutator member is strongly cooled, with a fast moving blast involving a relatively large volume of air which, because of its fast movement and large volume, effectively cools the commutator while being only slightly heated itself, so that any air which passes from the commutator end through the spaces between the stator poles and through the air gap of the generator-proper is of a temperature sufficiently low to provide adequate cooling of the generator-proper.

Figure 2:
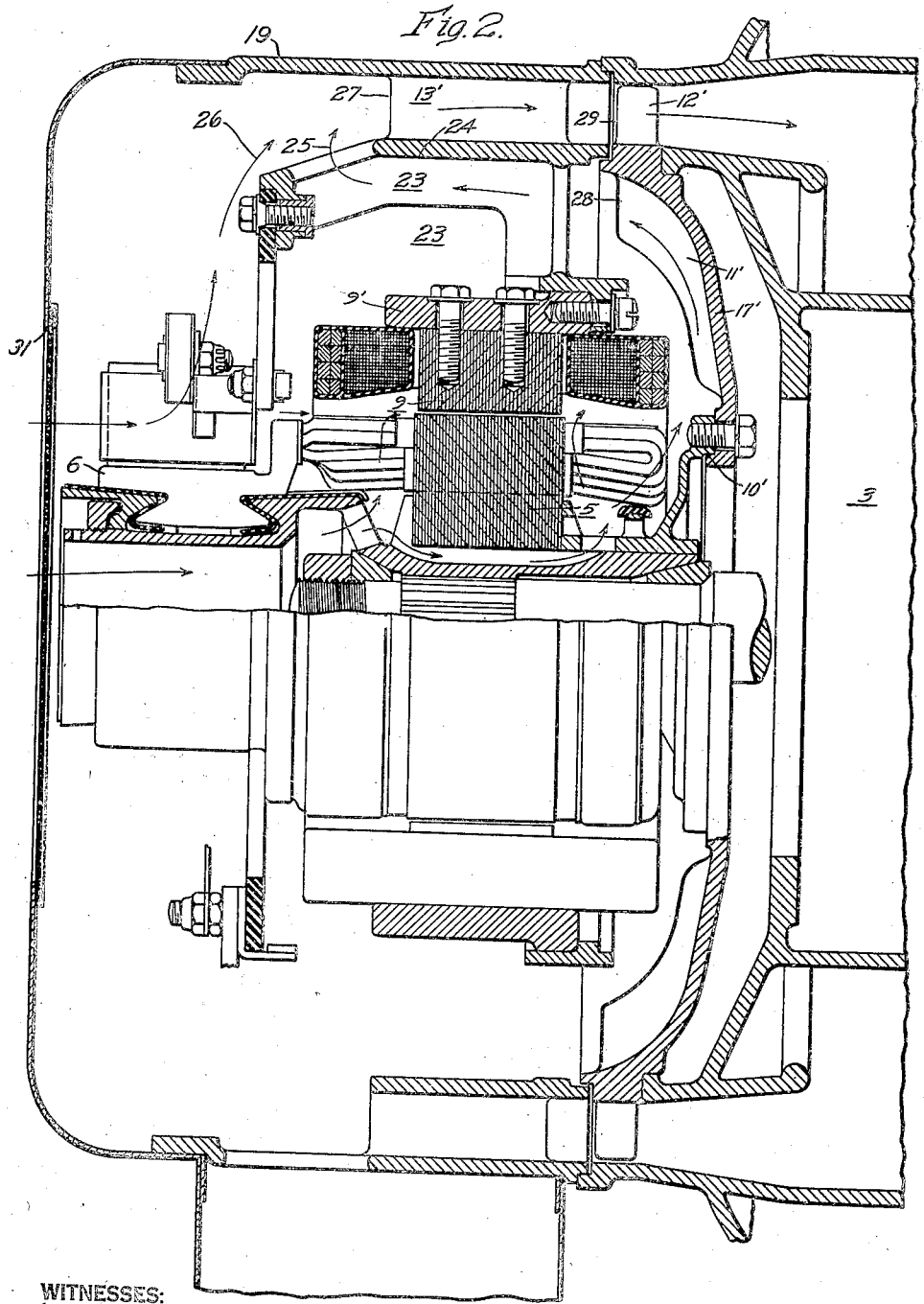

With the foregoing and other objects in view, my invention consists in the parts, structures, combinations and methods hereinafter described and claimed, and illustrated in the accompanying drawings, wherein:

Figure 1 is a side elevational view of a power plant embodying my invention, with parts broken away to show the top half of the generator in longitudinal section, and Fig. 2 is a similar view illustrating a modification.

As illustrated in Fig. 1, my invention is embodied in a power plant comprising an internal-combustion engine 3 having a shaft having an overhanging end 4. The overhanging shaft-end 4 carries the rotor-member 5 of a direct-current generator, which also includes a commutator 6 which is mounted on an overhanging front end-extension 7 of the generator-spider 8; and a generator-stator 9 which surrounds the rotor-member 5.

Mounted on the overhanging shaft-end 4, between the generator-rotor 5 and the engine 3, is my novel fan member 10, which is constructed with two differently effective fan-blade portions 11 and 12 at different radii. The inner blade-portion 11 is designed to draw a relatively small amount of air through the generator 5—9, and particularly through the rotor-member 5 thereof, at a relatively high air-pressure head; while the outer blade-portion 12 is designed to draw in a relatively large amount of air and to deliver it at a relatively low pressure-head.

In the particular design shown in Fig. 1, the two fan-portions 11 and 12 operate in parallel relative to each other, both supplying their outlet-air to the engine 3, which operates at a higher optimum temperature than the generator and hence can economically utilize ventilating-air which enters with a higher entrance-temperature than is desirable for the generator 5—9. In the design shown in Fig. 1, the air which enters the high-volume, low-pressure fan-blades 12 is drawn so that it passes around, rather than through, the generator 5—9. To this end, a large annular space 13 may be provided around the frame portion 9' of the stator-member proper, so as to provide an entrance-passage for this large volume of air, without requiring any large air-pressure head to force the air through this large annular passage 13.

It will be understood that suitable air-directing means are provided for guiding and directing the air through the paths just described. Thus, the rotor-member of the dynamo-electric machine is provided with various openings, such as 14, 15 and 16, for the air, and the inner blade-portions 11 of the fan are provided with internal inner and outer air guiding means 17 and 18, the latter constituting a rotating shroud for the inner fan-blades 11, and also serving as an air-guiding means for the outer blade-portion 12, and also as a suitable partition between the two blade-portions 11 and 12. The outer annular air-intake chamber 13 for the outer fan-blade portions 12 is provided by an outer casing-member 19. The two fan-blade portions 11 and 12 discharge into the space within the casing member 21 of the internal-combustion engine 3, so that the combined outputs of the two blade-portions 11 and 12 are supplied to the engine 3 to cool its cylinders 22.

The particular spider-construction 8 which is illustrated in the drawings is more specifically described and claimed in a copending application of E. O. Mueller and myself, Serial No. 297,340, filed September 30, 1939, for Spider construction for dynamo-electric machines.

The inner blade-portion 11 of the particular fan which is shown in Fig. 1 is of an improved fan-design, adapted for handling air at a relatively high pressure-head, while still passing an adequate quantity of air, as described and claimed more particularly in an application of C. F. Jenkins and R. E. Rambo, Serial No. 297,338, filed September 30, 1939, and assigned to the Westinghouse Electric & Manufacturing Company.

In the design shown in Fig. 1, it will be noted that the two blade-portions 11 and 12 discharge the air in streams which are approximately parallel to each other, and which flow in an approximately axial direction, said streams merging together and constituting the air-inlet of the engine 3.

In the form of my invention which is illustrated in Fig. 2, the inner blade-portions 11' of the fan 10' are of a more conventional design, operating on the centrifugal-fan principle, but the blade-supporting portion 17', instead of curving forwardly, in the direction of air-flow toward the engine 3, as in Fig. 1, curves backwardly over the generator-frame 9', so as to reverse the axial component of the air-flow. Thus, the air flows through the dynamo-electric machine in an axial direction toward the fan 10' and the engine 3, and then moves radially outwardly, under the impetus of the inner blade-portion 11' of the fan, and turns back on itself, so as to pass axially away from the fan 10' in an annular space 23 around the machine-frame proper 9', said annular space being provided by a tubular wall 24. The generator-ventilating air thus flows back, in the annular space 23, in an axial direction away from the fan 10', for a certain predetermined distance, after which the air moves radially outwardly, as indicated by the arrow 25, and mixes with other, incoming air 26 drawn from outside of the generator. At the same time, the radially outwardly flowing generator-air 25 again doubles back on itself, reversing its direction of axial flow, and joining the outside air 26 to flow axially in the annular intake-passage 13' leading to the outer blade-portions 12' of the fan 10'.

From the thus-described construction, shown in Fig. 2, it will be seen that two fan-blade portions 11' and 12' are in series with each other, except that additional air 26 is admitted, before the generator-cooling air 25 is passed on to the outer fan-blades 12'. The air leaving the outer blade-portions 12' is led directly into the chamber of the internal-combustion engine 3, to cool the latter.

In the design shown in Fig. 2, it will be noted that the fan-blade portions 11' and 12' discharge their air in axially opposite directions, the inner blade-portion 11 throwing the air back, away from the engine, while the outer blade-portion 12' throws the air on, into the engine 3.

The outer blade-portion 12 or 12', in both Fig. 1 and Fig. 2, is a propeller type of fan, in which the blades are set at an inclination, so as to move the air along, in an axial direction, as the blades cut through the air in their rotating or circumferential movement. It is essential, for the efficiency of such a propeller type of fan, that the air should enter the fan in approximately straight lines or paths, parallel to the axis, as distinguished from a spiral movement. By approximately straight, I do not mean the paths of the air-particles should be really straight, as a very slow spiral movement, of a very few revolutions per minute, would not seriously affect the efficiency of a fan which is rotating at hundreds or thousands of revolutions per minute; and hence I use the expression "approximately straight" to distinguish between air which is rotating spirally to any considerable extent and air which is not, as it approaches the entrance-portions of the propeller-fan blades 12 or 12'. In Fig. 1, the entrance-air which enters through the annular chamber 13, comes from the outside atmosphere, and does not move spirally, so that there is no particular problem in this regard.

In Fig. 2, however, the air which is delivered by the inner fan-blades 11, and thrown backwardly through the annular chamber 23 surrounding the stator frame 14 is rapidly spiraling, because of the centrifugal-type fan-blades 11', and it is very necessary to check this spiral movement or rapid rotation of the air before it is admitted to the propeller-type fan-blades 12'.

Accordingly, in the annular intake-chamber 13' for the air which is approaching the outer fan-blades 12', in Fig. 2, I provide air-straighteners, in the form of axially extending webs, tubes or ribs 27, for causing the air to move more nearly in straight lines parallel to the axis, rather than spirally, before the air is admitted to the propeller-type outer-blades 12'. In fact, my reason for providing the backwardly-curved air-guiding portion 17' of the fan 10', to reverse the axial component of the generator-ventilating air, and my reason for providing the two concentric annular chambers 23 and 13', with the air flowing in axially opposite directions in the two chambers, is all for the purpose of providing a certain longitudinal or axial length of air-flow between the outlet 28 of the inner blades 11' and the inlet 29 of the outer blades 12', wherein the rapidly spiraling flow of the air which leaves the outlet portion 28 of the inner blades 11' may be straightened into some semblance of laminar or substantially non-spiraling flow, in the outer annular chamber 13' which is provided with the air-straightening webs 27. If it were not for weight and space limitations, it would be more logical to separate the engine 3 and the generator 5—9 further away from each other, and to mount the two blade-portions 11' and 12' on separate fans which are axially spaced from each other by a sufficient distance to admit of straightening the air before permitting it to enter the propeller-type blade-portions 12', but such a construction would be impractical because of the extremely long shaft involved, and because of the enormously increased weight which it would entail.

In both of the illustrated embodiments of my invention, the outer housing or casing member 19 of the generator is provided with an air-inlet opening 31 surrounding the axis of the machine at a point close to the commutator member 6 at the front end of the machine, so that the fan-means 10 or 10' at the rear end of the generator, or between the generator and the internal-combustion engine, will cause much more air to be drawn, through the air-inlet opening 31, and into the space confined by the housing 19, than can pass through the restricted spaces which are available within the generator-proper, thereby providing a strong blast of air passing axially through said air-inlet opening 31 and blowing strongly over the commutator member 6. Most of this commutator-ventilating air is subsequently drawn radially outwardly into the annular surrounding-space 13 or 13' outside of the generator-proper, so that only a relatively small proportion of the commutator-ventilating air is drawn the rest of the way through the generator-proper. By reason of the rapid movement and the large quantity of this commutator-ventilating air, it not only efficiently cools the commutator member 6, but it is itself only relatively slightly heated in the process, so that such portion of said commutator-ventilating air as passes the rest of the way through the stator-member of the generator-proper is sufficiently cool so as to adequately cool the generator-proper. This improved cooling of the commutator-end of the generator contributes materially to the production of a generator having the utmost economy in size, weight, and ventilating-energy necessary to operate the same.

Since the primary object of my design is to keep the weight down to an absolute minimum, while at the same time obtaining the utmost in economy as to the gasoline-consumption necessary to drive the inner and outer fan-blade portions, I have adopted the novel design-principles which I have illustrated in Figs. 1 and 2 of my drawings. I desire it to be understood, however, that the illustrated designs are merely intended to be illustrations of the principles of the embodiment of my invention, and are not intended by way of restriction to any particular form or forms, as many changes may obviously be made by those skilled in the art, without departing from the essential spirit of my invention, particularly in its broader aspects I desire, therefore, that the appended claims be accorded their broadest construction consistent with their language and the prior art.

I claim as my invention:

1. A power plant comprising an internal-combustion engine having a shaft having an overhanging end, a fan and a rotor-member of an electric generator mounted on said overhanging shaft-end with the fan between the generator-rotor and the engine, and a stator-member of the generator mounted in cooperative relation to said rotor-member, said fan having two differently effective fan-blade portions at different radii and air-directing means cooperating therewith whereby a relatively small quantity of air is drawn through the generator and through the inner blade-portion of the fan at a relatively high pressure-head and a relatively large quantity of air is drawn through the outer blade-portion of the fan at a relatively low pressure-head, substantially all of the air of said fan being supplied to the engine to cool the latter, the outer blade-portion of the fan having an outside diameter which is larger than the outside diameter of the generator-stator proper, at least some of the air which enters said outer blade-portion passing over the generator-stator proper rather than through any substantial portion of the generator.

2. A power plant comprising an internal-combustion engine having a shaft having an overhanging end, a fan and a rotor-member of an electric generator mounted on said overhanging shaft-end with the fan between the generator-rotor and the engine, and a stator-member of the generator mounted in cooperative relation to said rotor-member, said fan having two differently effective fan-blade portions at different radii and air-directing means cooperating therewith whereby a relatively small quantity of air is drawn through the generator and through the inner blade-portion of the fan at a relatively high pressure-head and a relatively large quantity of air is drawn around the outside of the generator and through the outer blade-portion of the fan at a relatively low pressure-head, the air-outputs of the two blade-portions of the fan being mixed after leaving the fan, and the mixed air being supplied to the engine to cool the latter.

3. A power plant comprising an internal-combustion engine having a shaft having an overhanging end, a fan and a rotor-member of an electric generator mounted on said overhanging shaft-end with the fan between the generator-rotor and the engine, and a stator-member of the generator mounted in cooperative relation to said rotor-member, said fan having two differently effective fan-blade portions at different radii and air-directing means cooperating therewith whereby a relatively small quantity of air is drawn through the generator-rotor and through the inner blade-portion of the fan at a relatively high pressure-head, said air being thereafter directed axially reversely, so that it now flows for a predetermined distance away from said engine, after which the said air is directed radially outwardly and axially reversedly, so that this time it flows toward the engine in an outer annular passage surrounding the generator-stator proper, said air-directing means including means for admixing an additional quantity of air from outside of said generator to said outer annular passage, so that an augmented quantity of air flows in said passage, the arrangement being such that the outer blade-portion of said fan draws the augmented quantity of air through said passage at a relatively low pressure-head and delivers it to the engine to cool the latter.

4. The invention as defined in claim 3, characterized by air-straightening means, in said outer annular passage, tending to cause the air to move more nearly in straight lines parallel to the axis, rather than spirally.

5. In a ventilating system, a combination including an electrical machine requiring a relatively small amount of relatively cool intake-air at a relatively high pressure-drop within the machine, a second device requiring a relatively larger amount of relatively warmer intake-air at a relatively lower pressure-drop within the device, air-directing means for causing air to flow first through said electrical machine, then admixing, with the outlet-air from the machine, additional air which has not passed through the machine, and causing substantially the total air to then flow through the device, a first fan-means of a type capable of delivering the relatively small amount of air at the relatively high pressure-head for causing the air-flow through said electrical machine, and an auxiliary fan-means cooperating with said first fan-means so that the two fan-means together cause substantially said total air to flow through said device, said auxiliary fan-means being of a type capable of delivering a relatively large amount of air at the relatively low pressure-head.

6. The invention as defined in claim 5, characterized by said first and auxiliary fan-means being respectively inner and outer blade-portions of a single rotating fan disposed between said machine and said device.

7. The invention as defined in claim 5, characterized by said first and auxiliary fan-means being respectively inner and outer blade-portions of a single rotating fan disposed between said machine and said device, both of said blade-portions blowing the air axially in the same direction in substantially parallel streams.

8. In a ventilating system, a combination including a dynamo-electric machine having a rotor-member mounted on a shaft and a stator-member surrounding the rotor-member, said machine requiring a relatively small amount of relatively cool intake-air at a relatively high pressure-drop within the machine, a second device requiring a relatively larger amount of relatively warmer intake-air at a relatively lower pressure-drop within the device, air-directing means for causing air to flow first through said dynamo-electric machine, then admixing, with the outlet-air from the machine additional air which has not passed through the machine, and causing substantially the total air to then flow through the device, a fan mounted on said shaft between said rotor-member and said device, said fan having two differently effective fan-blade portions at different radii, the inner blade-portion being of a type capable of delivering the relatively small amount of air at the relatively high pressure-head and being disposed so as to cause the air-flow through said dynamo-electric machine, the outer blade-portion cooperating with said first blade-portion so that the two blade-portions together cause substantially said total air to flow through said device, said outer blade-portion being of a type capable of delivering a relatively large amount of air at the relatively low pressure-head.

9. In a ventilating system, a combination including a dynamo-electric machine having a rotor-member mounted on a shaft and a stator-member surrounding the rotor-member, said machine requiring a relatively small amount of relatively cool intake-air at a relatively high pressure-drop within the machine, a second device requiring a relatively larger amount of relatively warmer intake-air at a relatively lower pressure-drop within the device, air-directing means for causing air to flow first through said dynamo-electric machine, then admixing, with the outlet-air from the machine, additional air which has not passed through the machine, and causing substantially the total air to then flow through the device, a fan mounted on said shaft between said rotor-member and said device, said fan having two differently effective fan-blade portions at different radii, the inner blade-portion being of a type capable of delivering the relatively small amount of air at the relatively high pressure-head and being disposed so as to cause the air-flow through said dynamo-electric machine, the outer blade-portion cooperating with said first blade-portion so that the two blade-portions together cause substantially said total air to flow through said device, said outer blade-portion being of a type capable of delivering a relatively large amount of air at the relatively low pressure-head, both of said blade-portions blowing the air axially in the same direction in substantially parallel streams.

10. In a ventilating system, a combination including a dynamo-electric machine having a rotor-member mounted on a shaft and a stator-member surrounding the rotor-member, said machine requiring a relatively small amount of relatively cool intake-air at a relatively high pressure-drop within the machine, a second device requiring a relatively larger amount of relatively warmer intake-air at a relatively lower pressure-drop within the device, air-directing means for causing air to flow first through said dynamo-electric machine, then admixing, with the outlet-air from the machine, additional air which has not passed through the machine, and causing substantially the total air to then flow through the device, a fan mounted on said shaft between said rotor-member and said device, said fan having two differently effective fan-blade portions at different radii, the inner blade-portion being of a type capable of delivering the relatively small amount of air at the relatively high pressure-head and being disposed so as first to draw air through said rotor-member in a general direction toward the fan and then to blow the air radially outwardly and axially reversedly away from the fan and back in heat-exchanging relation to the stator-member of the machine, said air-directing means then causing the air to flow radially outwardly again and axially reversedly again so that it now admixes with the aforesaid additional air and flows toward the fan in an outer annular passage surrounding the generator-stator proper, the outer blade-portion of the fan being disposed so as to withdraw the air from said outer annular passage and to deliver it to said device, said outer blade-portion being of a type capable of delivering the relatively large amount of air at the relatively low pressure-head.

11. The invention as defined in claim 10, characterized by air-straightening means, in said outer annular passage, tending to cause the air to move more nearly in straight lines parallel to the axis, rather than spirally.

12. In a ventilating system, a combination including an electrical machine requiring a relatively small amount of relatively cool intake-air at a relatively high pressure-drop within the machine, a second device requiring a relatively larger amount of relatively warmer intake-air at a relatively lower pressure-drop within the device, a first fan-means of a type capable of delivering the relatively small amount of air at the relatively high pressure-head and disposed so as to cause the air-flow through said electrical machine, and an auxiliary fan-means of a type capable of delivering a relatively large amount of air at the relatively low pressure-head and disposed so as to draw in air which has passed around, rather than through, the electrical machine, and air-directing means for combining the outlet airstreams from both of said fan-means and causing the same to flow through said device.

13. In a ventilating system, a combination including an electrical machine requiring a relatively small amount of relatively cool intake-air at a relatively high pressure-drop within the machine, a second device requiring a relatively larger amount of relatively warmer intake-air at a relatively lower pressure-drop within the device, a first fan-means of a type capable of delivering the relatively small amount of air at the relatively high pressure-head and disposed so as to cause the air-flow through said electrical machine, and an auxiliary fan-means of a type capable of delivering a relatively large amount of air at the relatively low pressure-head and disposed so as to draw in the outlet-air delivered by said first fan-means, and also additional air which has passed around, rather than through, the electrical machine, and causing the total air to flow through said device.

14. In a ventilating system, a combination including a dynamo-electric machine having a rotor-member mounted on a shaft and a stator-member surrounding the rotor-member, said machine requiring a relatively small amount of relatively cool intake-air at a relatively high pressure-drop within the machine, a second device requiring a relatively larger amount of relatively warmer intake-air at a relatively lower pressure-drop within the device, a fan mounted on said shaft between said rotor-member and said device, said fan having two differently effective fan-blade portions at different radii, the inner blade-portion being of a type capable of delivering the relatively small amount of air at the relatively high pressure-head and being disposed so as to cause the air-flow through said dynamo-electric machine, the outer blade-portion being of a type capable of delivering a relatively large amount of air at the relatively low pressure-head and being disposed to draw in air which has passed around, rather than through, the dynamo-electric machine, both of said blade-portions blowing the air axially in the same direction in substantially parallel streams and delivering the combined streams of air to said device.

15. In a ventilating system, a combination including a dynamo-electric machine having a rotor-member mounted on a shaft and a stator-member surrounding the rotor-member, said machine requiring a relatively small amount of relatively cool intake-air at a relatively high pressure-drop within the machine, a second device requiring a relatively larger amount of relatively warmer intake-air at a relatively lower pressure-drop within the device, a fan mounted on said shaft between said rotor-member and said device, said fan having two differently effective fan-blade portions at different radii, the inner blade-portion being of a type capable of delivering the relatively small amount of air at the relatively high pressure-head and being disposed so as first to draw air through said rotor-member in a general direction toward the fan and then to blow the air radially outwardly and axially reversedly away from the fan and back in heat-exchanging relation to the stator-member of the machine, air-directing means for then causing the air to flow radially outwardly again and axially reversedly again so that it now admixes with additional air and flows toward the fan in an outer annular passage surrounding the generator-stator proper, the outer blade-portion of the fan being disposed so as to withdraw the air from said outer annular passage and deliver it to said device, said outer blade-portion being of a type capable of delivering a relatively large amount of air at the relatively low pressure-head.

16. The invention as defined in claim 15, characterized by air-straightening means, in said outer annular passage, tending to cause the air to move more nearly in straight lines parallel to the axis, rather than spirally.

17. A power plant comprising an internal-combustion engine and a direct-connected direct-current generator, the generator being mounted with its rear end presented towards the engine, the generator having a commutator member at its front end and having a stator member including a housing having an air-inlet opening adjacent to the commutator member, ventilating-means for causing ventilating-air to pass through the generator-proper and for causing much more air to be drawn into the housing than can be drawn the rest of the way through the generator-proper, said air passing axially through said air-inlet opening and including a strong blast blowing strongly over said commutator member, said housing having a tubular portion which surrounds the generator-proper in spaced relation thereto, said ventilating-means causing most of the commutator-ventilating air to be drawn through the surrounding-space between the generator-proper and the housing, and means for delivering the air from said surrounding-space and the air which passes through the generator-proper to jointly ventilate said engine.

GEORGE A. MOORE.